United States Patent
Saghir et al.

(10) Patent No.: US 12,416,495 B2
(45) Date of Patent: Sep. 16, 2025

(54) SYSTEMS AND METHODS FOR DETERMINING AN ALTITUDE OF A WIRELESS STATION

(71) Applicant: Verizon Patent and Licensing Inc., Basking Ridge, NJ (US)

(72) Inventors: Amir Saghir, Frisco, TX (US); Mingxing S. Li, San Jose, CA (US); Rakesh Chandwani, Morganville, NJ (US); Edward Amoah, Parsippany, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 380 days.

(21) Appl. No.: 18/049,075

(22) Filed: Oct. 24, 2022

(65) Prior Publication Data

US 2024/0133687 A1    Apr. 25, 2024
US 2024/0230328 A9    Jul. 11, 2024

(51) Int. Cl.
G01C 5/06    (2006.01)
G01C 25/00   (2006.01)
G01L 27/00   (2006.01)
H04W 4/02    (2018.01)
H04W 4/38    (2018.01)

(52) U.S. Cl.
CPC .............. *G01C 5/06* (2013.01); *G01C 25/00* (2013.01); *G01L 27/002* (2013.01); *H04W 4/02* (2013.01); *H04W 4/025* (2013.01); *H04W 4/38* (2018.02)

(58) Field of Classification Search
USPC .......................................................... 702/4
See application file for complete search history.

(56) References Cited

U.S. PATENT DOCUMENTS

| | | | |
|---|---|---|---|
| 6,518,918 B1* | 2/2003 | Vannucci | G01C 5/06 342/174 |
| 2013/0079039 A1* | 3/2013 | Heikkilae | G01S 5/0045 455/456.6 |
| 2013/0325385 A1* | 12/2013 | Shin | G01C 5/06 702/94 |
| 2014/0200846 A1* | 7/2014 | Wachter | G01C 5/06 702/138 |
| 2016/0047648 A1* | 2/2016 | Edge | G01C 5/06 73/384 |
| 2017/0075037 A1* | 3/2017 | Springer | H04W 48/16 |
| 2017/0219342 A1* | 8/2017 | Morioka | G01C 5/06 |
| 2019/0124617 A1* | 4/2019 | Jones | H04W 64/003 |
| 2019/0349467 A1* | 11/2019 | Zhu | H04W 4/38 |

* cited by examiner

*Primary Examiner* — Paul D Lee

(57) ABSTRACT

A device may receive small cell data associated with a small cell, wherein the small cell data includes small cell location data and a small cell barometric pressure reading. The device may identify a calibration user device connected to the small cell and may receive, from the calibration user device, a user device barometric pressure reading. The device may calibrate, based on the user device barometric pressure reading, the small cell barometric pressure reading to obtain a calibrated small cell barometric pressure reading. The device may identify a reference weather station and may receive, from the reference weather station, weather station data, wherein the weather station data includes a weather station barometric pressure reading, and a weather station altitude that indicates an altitude of the reference weather station. The device may determine a small cell altitude based on the calibrated small cell barometric pressure reading and the weather station data.

20 Claims, 8 Drawing Sheets

SYSTEMS AND METHODS FOR DETERMINING AN ALTITUDE OF A WIRELESS STATION

BACKGROUND

In wireless communications, a small cell is a small, low-power wireless base station, typically with low radio frequency (RF) power output, footprint, and range. Small cells enhance cellular network coverage and capacity in areas—such as densely populated city centers, in a home or small business. A small cell typically has a smaller coverage area than a macro cell (e.g., associated with cellular communications), such as an evolved Node B (eNB) or a next generation Node B (gNB).

DETAILED DESCRIPTION OF EXAMPLE EMBODIMENTS

Figure 1A:
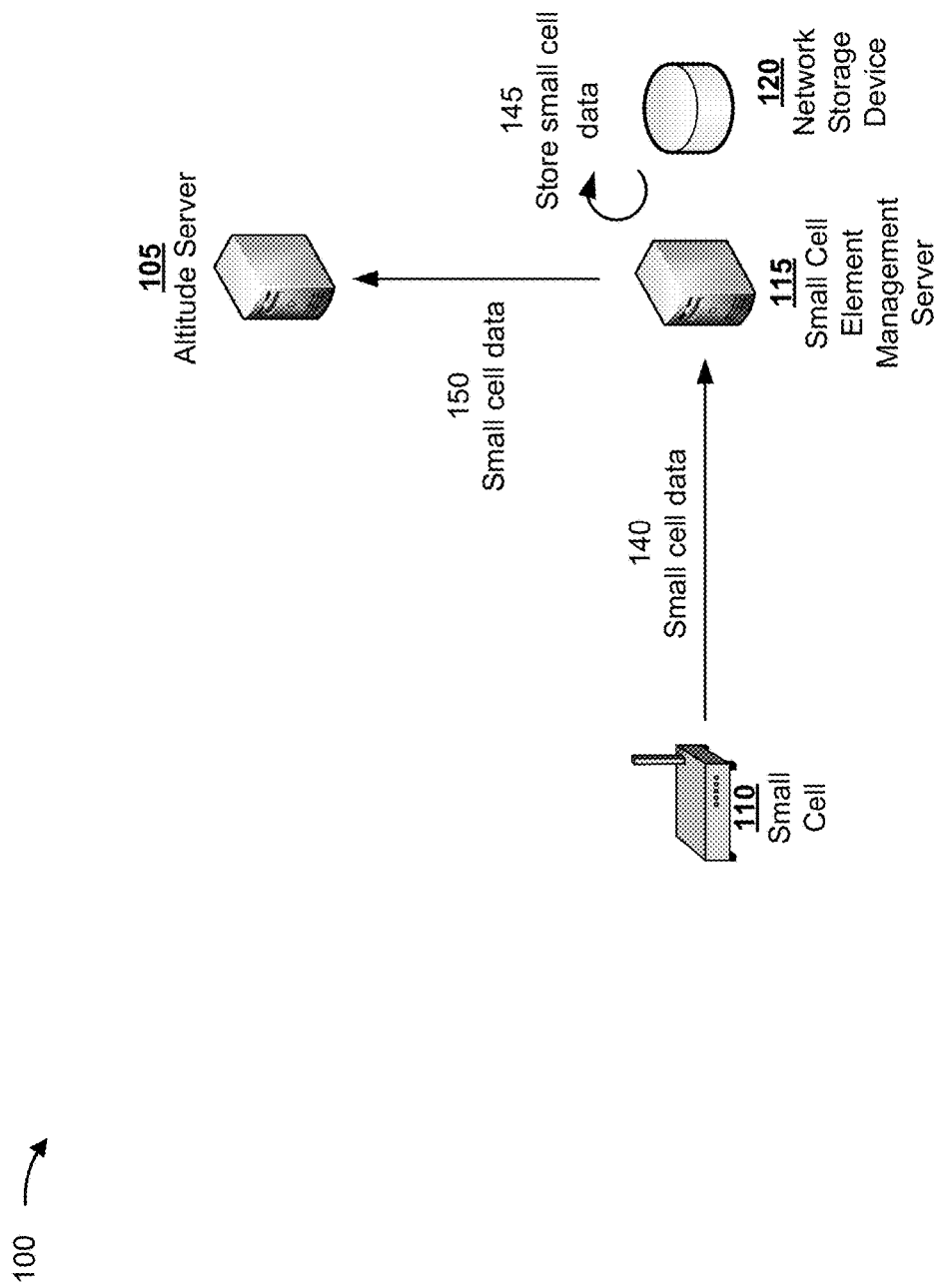
FIGS. 1A-1E are diagrams of an example associated with determining an altitude of a small cell.

The following detailed description of example implementations refers to the accompanying drawings. The same reference numbers in different drawings may identify the same or similar elements.

Typically, a small cell may include a pressure sensor (e.g., a barometric pressure device) that provides a barometric pressure reading that the small cell can use to determine an altitude (e.g., an elevation above, or below, a surface such as sea level) of the small cell. The small cell then typically provides a reported altitude of the small cell to other systems or devices, such as a spectrum access system or a location server associated with an emergency services provider (e.g., that utilizes E911 services). However, such a pressure sensor may become inaccurate over time and is not able to be recalibrated after manufacture of the small cell. Consequently, the small cell may provide an erroneous reported altitude of the small cell to the other systems or devices, which may affect spectrum allocation to the small cell and/or impacts an ability for emergency services to be provided to a physical location of the small cell.

For example, the spectrum access system may determine, based on the erroneous reported altitude of the small cell, an unoptimized spectrum allocation for the small cell. This results in either an allocation and waste of unused spectrum (e.g., when a spectrum allocation for the small cell is too high), or causes throughput issues (e.g., when the spectrum allocation for the small cell is too low), such that traffic (e.g., between a user device and a network) is delayed when transmitting via the small cell. As another example, the location server associated with the emergency services provider may determine, based on the erroneous reported altitude of the small cell, an incorrect physical location (e.g., an incorrect floor or level) of the small cell, which may cause the emergency services provider to dispatch emergency services to the incorrect physical location (rather than a correct physical location of the small cell that requires the emergency services). This can result in delayed dispatch of the emergency services to the correct physical location.

Some implementations described herein provide an altitude server that obtains small cell data from a small cell, respective user data from one or more user devices connected to the small cell, and/or respective weather station data from one or more weather stations that are within a close proximity of the small cell. The small cell data includes small cell location data (e.g., that indicates a latitude and a longitude of the small cell) and a small cell barometric pressure reading. The user data provided by each user device includes user device location data (e.g., that indicates a latitude and a longitude of the user device) and a user device barometric pressure reading. The weather station data provided by each weather station includes weather station location data (e.g., that indicates a latitude, a longitude, and an elevation of the weather station) and weather station barometric pressure reading.

In some implementations, the altitude server identifies a calibration user device, of the one or more user devices. For example, the altitude server may identify a user device with a highest small cell power measurement (e.g., a highest power level of a signal provided by the small cell) as the calibration user device. The altitude server then calibrates the small cell barometric pressure reading based on the user device barometric pressure reading of the calibration user device. In some implementations, the altitude server identifies a reference weather station, of the one or more weather stations. For example, the altitude server identifies a weather station that is physically closest to the small cell as the reference weather station. The altitude server may then determine, based on the calibrated small cell barometric reading and the weather station data of the reference weather station, an altitude of the small cell.

In this way, the altitude server is able to more accurately determine an altitude of the small cell, which may not be possible when relying only on the small cell data provided by the small cell. Further, in some implementations, the altitude server may provide small cell altitude data (e.g., that indicates the altitude of the small cell) to other systems or devices, such as a spectrum access system or a location server associated with an emergency services provider. This causes an improved spectrum allocation to be provided to the small cell and/or improves an ability for emergency services to be provided to a physical location of the small cell.

For example, the spectrum access system may determine, based on the small cell altitude data, an optimized spectrum allocation for the small cell. This results in a lower likelihood of a spectrum allocation for the small cell that is too high, and therefore a reduced likelihood of allocation and waste of unused spectrum. Further, this results in a lower likelihood of a spectrum allocation for the small cell that is too low, which decreases a likelihood of throughput issues. Therefore, traffic (e.g., between a user device and a network) is less likely to be delayed when transmitting via the small cell.

As another example, the location server associated with the emergency services provider is more likely to determine, based on the small cell altitude data, a correct physical location (e.g., a correct floor or level) of the small cell. This reduces a likelihood that the emergency services provider dispatches emergency services to an incorrect physical location. Accordingly, this reduces a likelihood that dispatch of the emergency services to the correct physical location is delayed.

FIGS. 1A-1E are diagrams of an example 100 associated with determining an altitude of a small cell. As shown in FIGS. 1A-1E, example 100 includes an altitude server 105, a small cell 110, a small cell element management server 115, a network storage device 120, one or more user devices 125 (shown as user devices $125_1$ through $125_n$, where n>1), one or more weather stations 130 (shown as user devices $130_1$ through $130_m$, where m>1), and/or an external server 135, which are further described herein in relation to FIGS. 2 and 3. The one or more user devices 125 may be connected to the small cell 110 (e.g., a wireless communication connection may exist between each of the one or more user devices 125 and the small cell 110).

As shown in FIG. 1A, and by reference number 140, the small cell 110 may provide small cell data to the small cell element management server 115. For example, the small cell 110 may transmit, via a communication connection between the small cell 110 and the small cell element management server 115, the small cell data to the small cell element management server 115. The small cell 110 may transmit the small cell data on a scheduled basis, on an on-demand basis, on a triggered basis, or on an ad-hoc basis, among other examples. In this way, the small cell element management server 115 may receive the small cell data from the small cell 110.

The small cell data may include information identifying the small cell 110 (e.g., a unique identifier of the small cell 110), small cell location data (e.g., that indicates a physical location of the small cell 110), and/or a small cell barometric pressure reading (e.g., that indicates a barometric pressure of the small cell 110 at the physical location of the small cell 110). The small cell location data may include a longitude component (e.g., that indicates a longitude of the physical location), a latitude component (e.g., that indicates a latitude of the physical location), and/or another component indicative of the physical location of the small cell 110 that is determined by a location device, such as a global positioning system (GPS) device, of the small cell 110. The small cell barometric pressure reading may be captured by a barometric pressure device of the small cell 110, or may be determined based on the small cell location data (e.g., estimated based on the small cell location data).

As shown by reference number 145, the small cell element management server 115 may store the small cell data. For example, the small cell element management server may communicate with the network storage device 120 to cause the network devices to save the small cell data in an entry of the network storage device 120. In this way, the entry may identify the small cell 110, the physical location of the small cell 110, and/or the barometric pressure of the small cell 110 at the physical location.

Additionally, or alternatively, as shown by reference number 150 the small cell element management server 115 may provide the small cell data to the altitude server 105. For example, the small cell element management server 115 may transmit, via a communication connection between the small cell element management server 115 and the altitude server 105, the small cell data to the altitude server 105. The small cell element management server 115 may transmit the small cell data on a scheduled basis, on an on-demand basis, on a triggered basis, or on an ad-hoc basis, among other examples. In this way, the altitude server 105 may receive the small cell data from the small cell element management server 115.

Figure 1B:
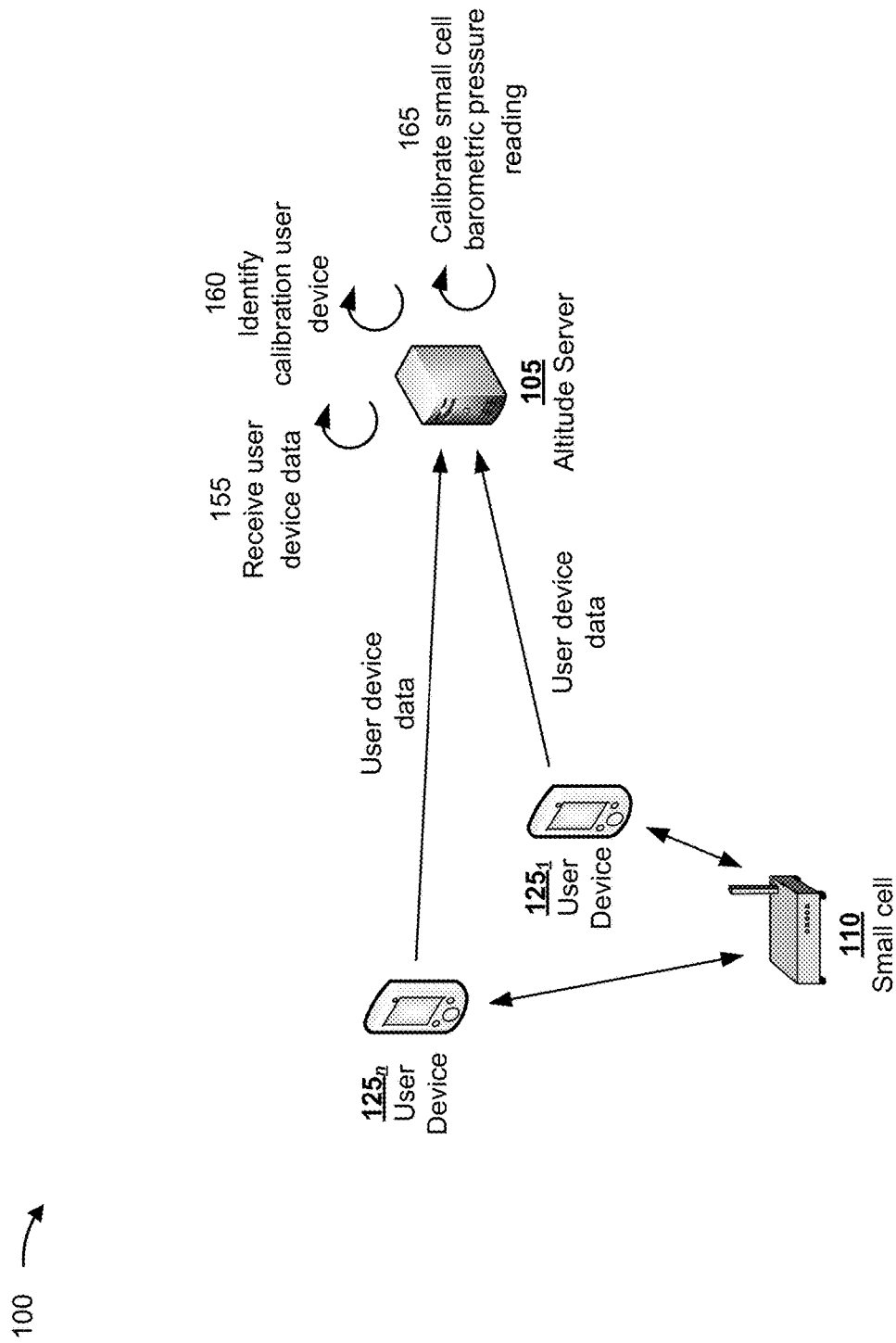

As shown in FIG. 1B, each user device 125, of the one or more user devices 125 (e.g., that are connected to the small cell 110), may provide user device data to the altitude server 105. For example, each user device 125 may transmit, via a communication connection between the user device 125 and the altitude server 105, the user device data to the altitude server 105. As another example, each user device 125 may transmit, via communications connections of the small cell 110 and the small cell element management server 115, the user device data to the altitude server 105. Each user device 125 may transmit the user device data on a scheduled basis, on an on-demand basis, on a triggered basis, or on an ad-hoc basis, among other examples. In this way, the altitude server 105 may receive respective user device data from the one or more user devices 125.

The user device data provided by a user device 125 may include information identifying the user device 125 (e.g., a unique identifier of the user device 125), user device location data (e.g., that indicates a physical location of the user device 125), a user device barometric pressure reading (e.g., that indicates a barometric pressure of the user device 125 at the physical location of the user device 125), and/or a small cell power measurement (e.g., that indicates a power level of a signal received by the user device 125 from the small cell 110, such as a power level of a signal associated with a wireless communication connection between the small cell 110 and the user device 125). The user device location data may include a longitude component (e.g., that indicates a longitude of the user device 125 at the physical location), a latitude component (e.g., that indicates a latitude of the user device 125 at the physical location), and/or another component indicative of the physical location of the user device 125 that is determined by a location device, such as a GPS device, of the user device 125. The user device barometric pressure reading may be captured by a barometric pressure device of the user device 125, or may be determined based on the user device location data (e.g., estimated based on the user device location data).

As shown by reference number 160, the altitude server 105 may identify a calibration user device 125 (e.g., of the one or more user devices 125 connected to the small cell 110). The altitude server 105 may identify a user device 125 as the calibration user device 125 (also referred to herein as a calibration device) based on one or more factors. For example, the altitude server 105 may identify a user device 125 that has a highest small cell power measurement (e.g., when a factor is a small cell power measurement), or that is physically closest to the small cell 110 (e.g., when a factor is distance to the small cell 110), as the calibration user device 125.

For example, the altitude server 105 may identify the one or more user devices 125 (e.g., may identify the one or more user devices 125 as connected to the small cell 110). The altitude server 105 may identify the one or more user devices 125 based on receiving the respective user device data from the one or more user devices 125. Accordingly, the altitude server 105 may process (e.g., parse and/or read) the respective user device data, to determine respective small cell power measurements of the one or more user devices 125. The altitude server 105 then may identify a user device 125, of the one or more user devices 125, that has a highest small cell power measurement of the respective small cell power measurements. That is, the altitude server 105 may identify the user device 125 that has small cell power measurement that is greater than or equal to small cell power measurements of the other user devices 125 of the one or more user devices 125.

As another example, the altitude server 105 may process (e.g., parse and/or read) the respective user device data, to determine respective distances of the one or more user devices 125 to the small cell 110 (e.g., distances from the physical locations of the one or more user device 125 to the physical location of the small cell 110). The altitude server 105 then may identify a user device 125, of the one or more user devices 125, that is physically closest to the small cell 110. That is, altitude server 105 may identify the user device 125 that has a distance to the small cell 110 that is less than or equal to distances to the small cell 110 of the other user devices 125 of the one or more user devices 125.

As shown by reference number 165, the altitude server 105 may calibrate the small cell barometric pressure reading (e.g., that is included in the small cell data that was provided by the small cell 110, as described herein in relation to FIG. 1A). In some implementations, the altitude server 105 may calibrate, based on the user device barometric pressure reading of the calibration user device 125 (e.g., that is included in the user device data that was provided by the calibration user device 125, as described herein in relation to reference number 155), the small cell barometric pressure reading to obtain a calibrated small cell barometric pressure reading. For example, the altitude server 105 may process (e.g., using one or more models and/or maps) the small cell barometric pressure reading and the user device barometric pressure reading (also referred to herein as the "calibration device barometric pressure reading") to obtain a calibrated small cell barometric pressure reading. As another example, the altitude server 105 may process (e.g., using one or more models and/or maps) the small cell barometric pressure reading and the user device barometric pressure reading, and at least one of the small cell location data of the small cell 110 (e.g., that is included in the small cell data), the user device location data of the calibration user device 125 (e.g., that is included the user device data of the calibration user device 125), or the small cell power measurement of the calibration user device 125 (e.g., that is included in the user data) to obtain a calibrated small cell barometric pressure reading.

Figure 1C:
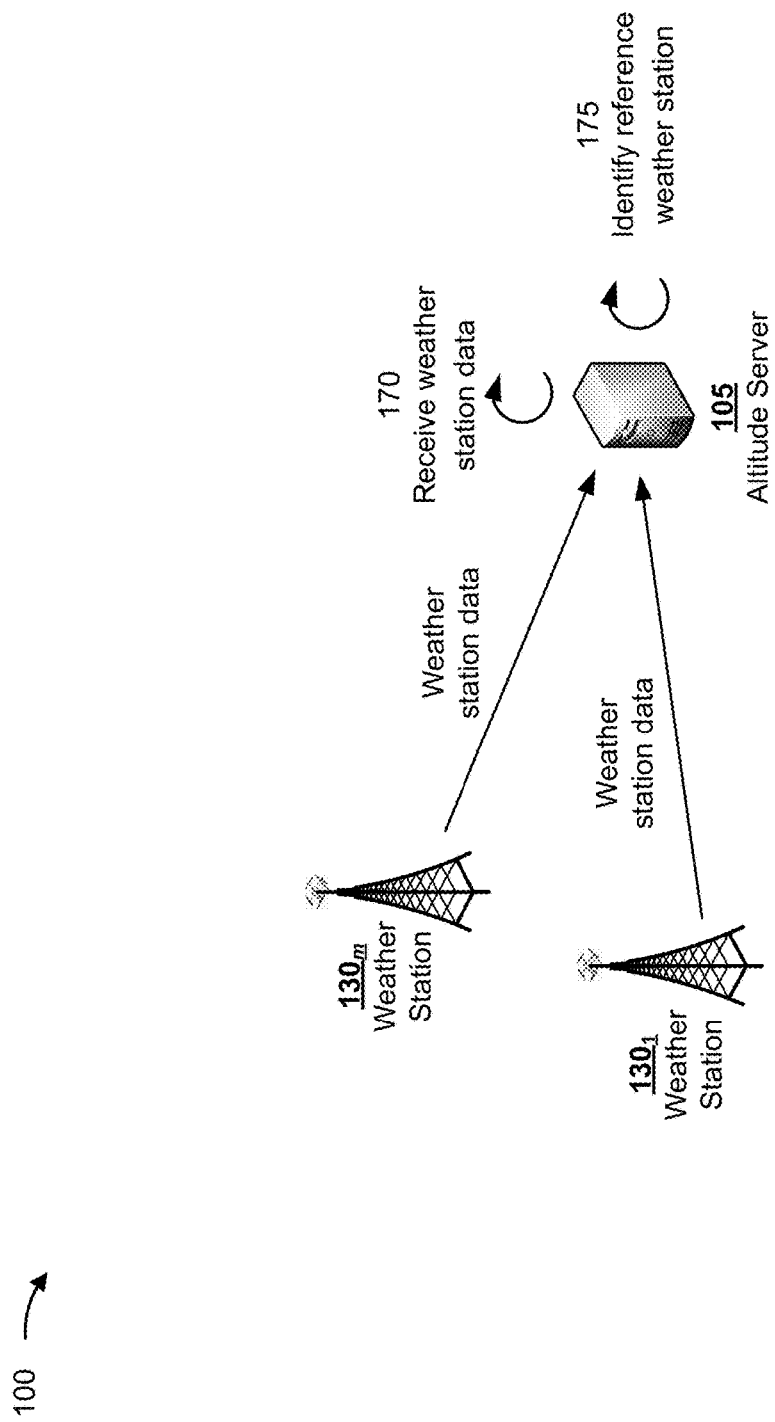

As shown in FIG. 1C, and by reference number 170, each weather station 130, of the one or more weather station 130, may provide weather station data to the altitude server 105. For example, each weather station 130 may transmit, via a communication connection between the weather station 130 and the altitude server 105, the weather station data to the altitude server 105. Each weather station 130 may transmit the weather station data on a scheduled basis, on an on-demand basis, on a triggered basis, or on an ad-hoc basis, among other examples. In this way, the altitude server 105 may receive respective weather station data from the one or more weather stations 130.

The weather station data provided by a weather station 130 may include information identifying the weather station 130 (e.g., a unique identifier of the weather station 130), weather station location data (e.g., that indicates a physical location of the weather station 130) and/or a weather station barometric pressure reading (e.g., that indicates a barometric pressure of the weather station 130 at the physical location of the weather station 130). The weather station location data may include a longitude component (e.g., that indicates a longitude of the weather station 130 at the physical location), a latitude component (e.g., that indicates a latitude of the weather station 130 at the physical location), an altitude component (e.g., that indicates an altitude of the weather station 130 at the physical location, and/or another component indicative of the physical location of the weather station 130) that is determined by a location device, such as a GPS device, of the weather station 130. The weather station barometric pressure reading may be captured by a barometric pressure device of the weather station 130, or may be determined based on the weather station location data (e.g., estimated based on the weather station data).

As shown by reference number 175, the altitude server 105 may identify a reference weather station 130 (e.g., from the one or more weather stations 130). The altitude server 105 may identify a weather station 130 that is physically closest to the small cell 110 as the reference weather station 130.

For example, the altitude server 105 may identify (e.g., based on the small cell location data provided by the small cell 110 and the respective weather station location data provided by the one or more weather stations 130) a set of one or more weather stations 130, of the one or more weather stations 130, that are within a distance threshold (e.g., that may be less than or equal to 100 meters (m), 500 m, 1 kilometer (1 km), 2 km, 3 km, and/or 5 km, among other examples) of the small cell 110. In some implementations, the altitude server 105 may identify (e.g., based on the small cell location data provided by the small cell 110 and the respective weather station location data provided by the one or more weather stations 130) a weather station 130, of the set of one or more weather stations 130, that is closest to the small cell 110 (e.g., that is closest to the physical location of the small cell 110). That is, the altitude server 105 may identify the weather station 130 that has a distance to the small cell 110 that is less than or equal to distances to the small cell 110 of the other weather stations 130 of the set of one or more weather stations 130.

Figure 1D:
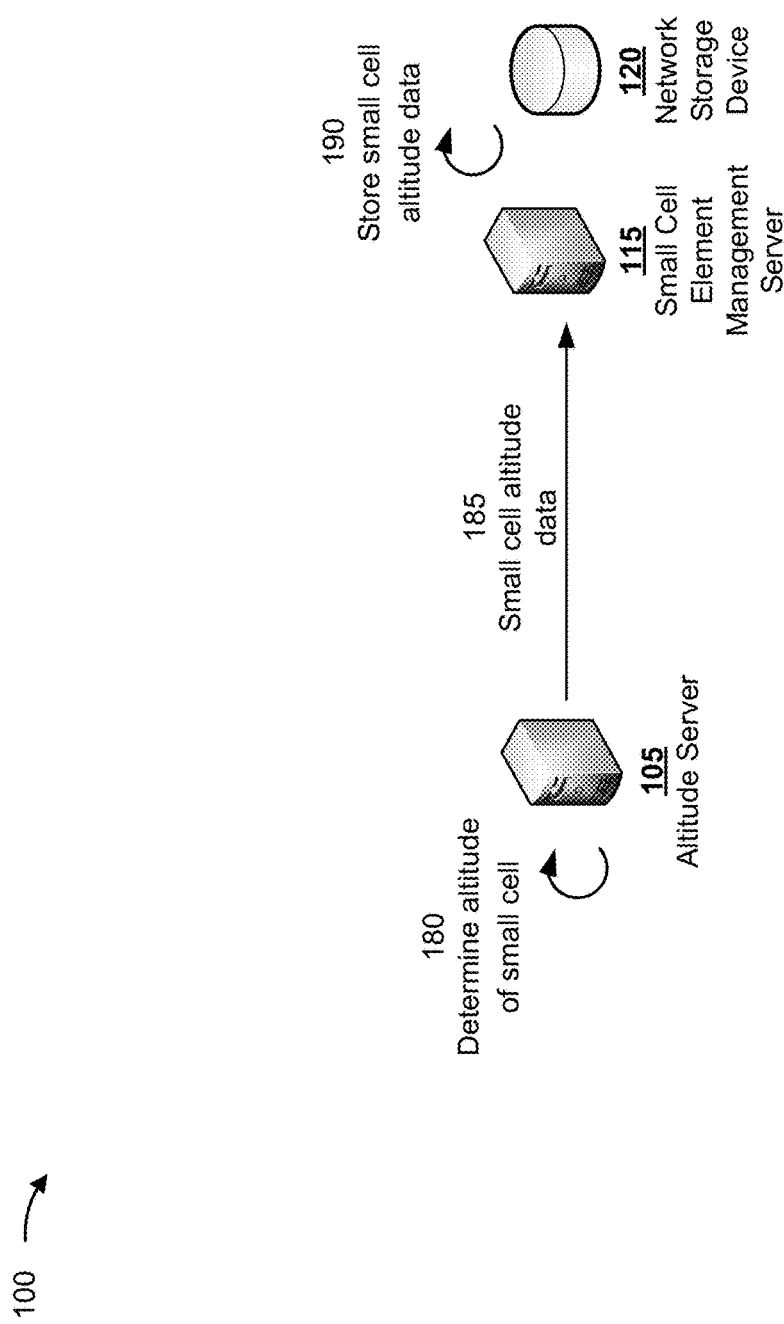

As shown in FIG. 1D, and by reference number 180, the altitude server 105 may determine an altitude (e.g., an elevation above, or below, a surface such as sea level) of the small cell 110 (also referred to herein as small cell altitude). The altitude server 105 may determine the altitude of the small cell 110 based on the calibrated small cell barometric pressure reading and/or the weather station data received from the reference weather station 130. For example, the altitude server 105 may process (e.g., using one or more models and/or maps) the calibrated small cell barometric pressure reading and/or the weather station data to determine the altitude of the small cell 110. As another example, the altitude server 105 may process (e.g., using one or more models and/or maps) the calibrated small cell barometric pressure reading and/or at least one of weather station location data (e.g., that is included in the weather station data, and that includes a longitude component, a latitude component, and/or an altitude component that are indicative of a physical location of the reference weather station 130) or a weather station barometric pressure reading (e.g., that is included in the weather station data, and that indicates a barometric pressure at the physical location of the reference weather station 130) to determine the altitude of the small cell 110.

As shown by reference number 185, the altitude server 105 may provide small cell altitude data to the small cell element management server 115. For example, the altitude server 105 may transmit, via the communication connection between the altitude server 105 and the small cell element management server 115, the small cell altitude data to the small cell element management server 115. The altitude server 105 may transmit the small cell altitude data on a scheduled basis, on an on-demand basis, on a triggered basis, or on an ad-hoc basis, among other examples. In this way, the small cell element management server 115 may receive the small cell altitude data from the altitude server 105. The small cell altitude data may indicate the altitude of the small cell 110 (e.g., may indicate the small cell altitude).

As shown by reference number 190, the small cell element management server 115 may store the small cell altitude data. For example, the small cell element management server may communicate with the network storage device 120 to cause the network devices to save the small cell data in the entry of the network storage device 120 that includes the small cell data. In this way, the entry may indicate an association between the small cell data and the small cell altitude data.

Figure 1E:
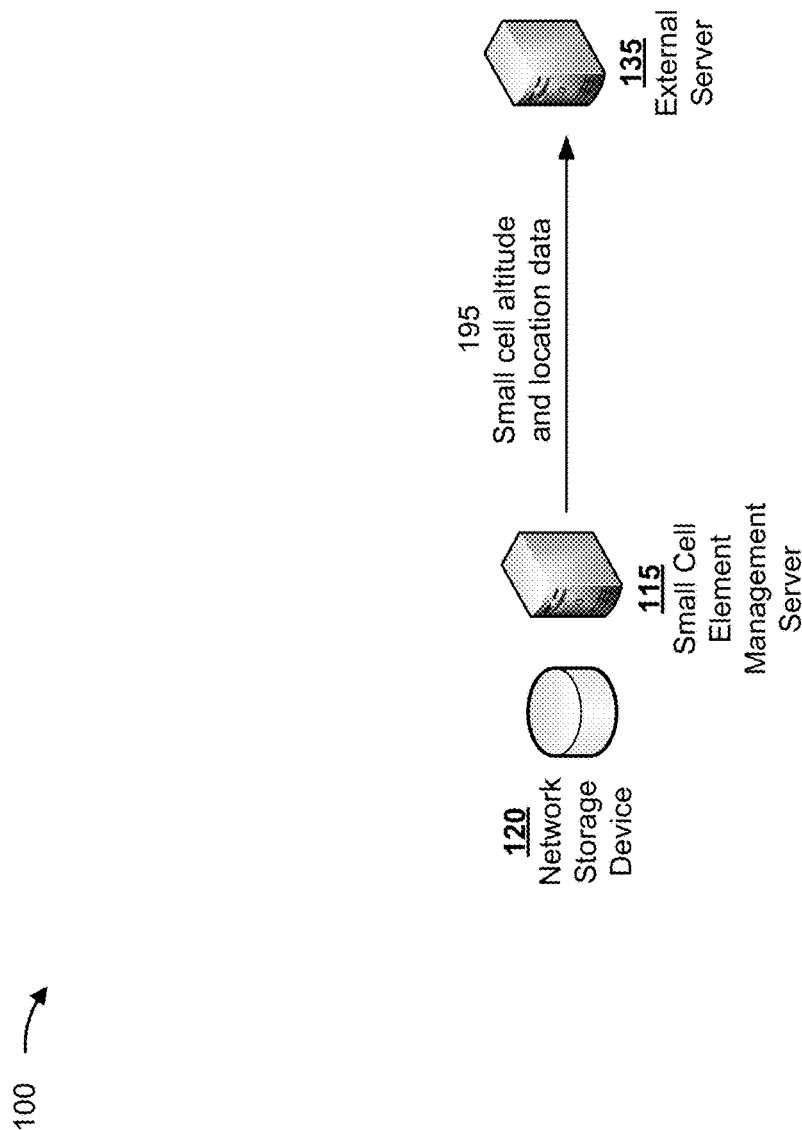

As shown in FIG. 1E, and by reference number 195, the small cell element management server 115 may provide the small cell data and/or the small cell altitude data to the external server 135. For example, the small cell element management server 115 may transmit, via a communication connection between the small cell element management server 115 and the external server 135, the small cell data and/or the small cell altitude data to the external server 135. The small cell element management server 115 may transmit the small cell data and/or the small cell altitude data on a scheduled basis, on an on-demand basis, on a triggered basis, or on an ad-hoc basis, among other examples. In this way, the external server 135 may receive the small cell data and/or the small cell altitude data from the small cell element management server 115.

In some implementations, the external server 135 may be a spectrum access system server (e.g., that controls a spectrum allocation for the small cell 110). Accordingly, the external server 135, based on the small cell data and/or the small cell altitude data, may modify the spectrum allocation for the small cell 110 (e.g., increase or decrease the spectrum allocation, and/or change one or more parameters associated with the spectrum allocation). For example, the external server 135 may identify, based on the small cell data, the physical location of the small cell 110 and may determine, based on the small cell altitude data, the altitude of the small cell 110, and may thereby modify the spectrum allocation for the small cell 110 to enable an optimal performance (e.g., an optimal wireless communication performance) of the small cell 110 and/or the one or more user devices 125 connected to the small cell 110.

In some implementations, the external server 135 may be a location server, such as location server associated with an emergency services provider (e.g., that utilizes E911 services). Accordingly, the external server 135 may identify, based on the small cell data and/or the small cell altitude data, a dispatchable location (e.g., the physical location) of the small cell 110 to which emergency services are to be dispatched (e.g., when a user device 125 connected to the small cell 110 establishes a 911 emergency services call). For example, the external server 135 may identify, based on the small cell data, the physical location of the small cell 110 and may determine, based on the small cell altitude data, the altitude of the small cell 110, and may thereby determine the dispatchable location. The external server 135 then may provide the dispatchable location to a device of the emergency services provider to enable the emergency service provider to quickly and accurately dispatch emergency services to the dispatchable location.

In some implementations, one or more of the processing steps described herein in relation to FIGS. 1A-1E may be performed repeatedly (e.g., a part of an iterative looping process). For example, the one or more processing steps may be performed again after a time threshold has passed. The time threshold may be greater than or equal to, for example, an hour, 12 hours, a day, two days, three days, a week, and/or a month, among other examples.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
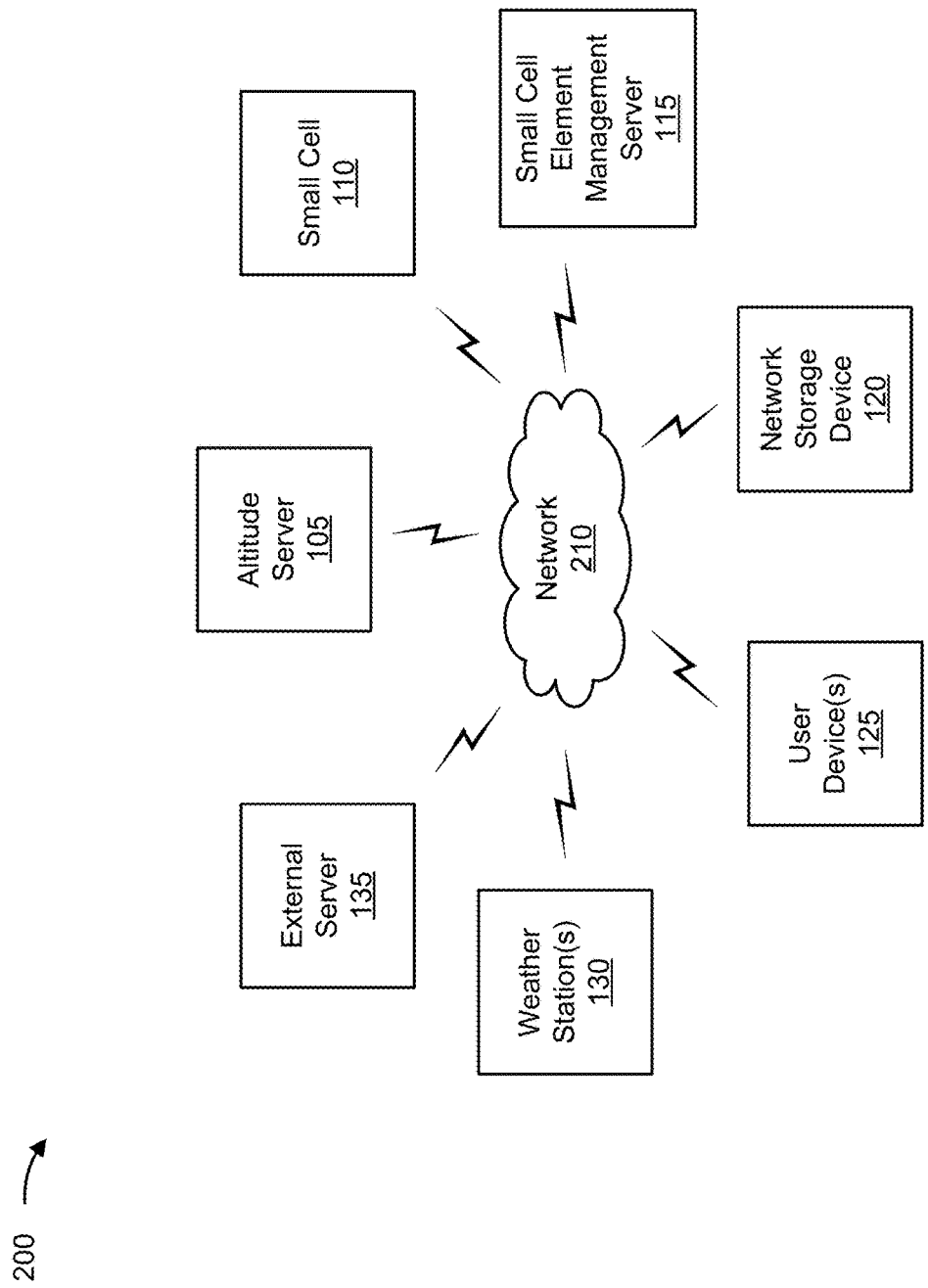
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include the altitude server 105, the small cell 110, the small cell element management server 115, the network storage device 120, the one or more user devices 125, the one or more weather stations 130, the external server 135, and a network 210. Devices of environment 200 may interconnect via wired connections, wireless connections, or a combination of wired and wireless connections.

The altitude server 105 may include one or more devices capable of receiving, generating, storing, processing, providing, and/or routing information associated with determining an altitude of a small cell, as described elsewhere herein. The altitude server 105 may include a communication device and/or a computing device. For example, the altitude server 105 may include a server, such as an application server, a client server, a web server, a database server, a host server, a proxy server, a virtual server (e.g., executing on computing hardware), or a server in a cloud computing system. In some implementations, the altitude server 105 may include computing hardware used in a cloud computing environment.

The small cell 110 may include one or more devices capable of wirelessly transferring traffic, such as audio, video, text, and/or other traffic, destined for and/or received from a user device, such as the user device(s) 125. In some implementations, the small cell 110 may receive traffic from and/or sends traffic to the network 210. Additionally, or alternatively, the small cell 110 may send traffic to and/or receive traffic from the user device(s) 125 via an air interface. In some implementations, the small cell 110 may include a femtocell, a picocell, a small cell, or other customer premises equipment configured to facilitate wireless communications between the user device(s) 125 and the network 210. The small cell 110 may include a location device (e.g., a global positioning system (GPS) device, or another location device) and a barometric pressure device (e.g., for capturing a user device barometric pressure reading). The small cell 110 may be configured to provide small cell data to the altitude server 105, as described herein.

The small cell element management server 115 may include one or more devices capable of receiving, generating, storing, processing, providing, and/or routing information associated with determining an altitude of a small cell, as described elsewhere herein. The small cell element management server 115 may include a communication device and/or a computing device. For example, the small cell element management server 115 may include a server, such as an application server, a client server, a web server, a database server, a host server, a proxy server, a virtual server (e.g., executing on computing hardware), or a server in a cloud computing system. In some implementations, the small cell element management server 115 may include computing hardware used in a cloud computing environment. The small cell element management server 115 may be configured to manage the small cell 110 and/or to facilitate communications between the small cell 110 and the altitude server 105 (e.g., via the network 210).

The network storage device 120 may include one or more devices capable of receiving, generating, storing, processing, and/or providing information associated with determining an altitude of a small cell, as described elsewhere herein. The network storage device 120 may include a communication device and/or a computing device. For example, the network storage device 120 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the network storage device 120 may store small cell data and/or small cell altitude data, as described elsewhere herein.

The user device(s) 125 may include one or more devices capable of receiving, generating, storing, processing, and/or providing information associated with determining an altitude of a small cell, as described elsewhere herein. The user device(s) 125 may include a communication device and/or a computing device. For example, the user device(s) 125 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device. The user device(s) 125 may include a location device (e.g., a global positioning system (GPS) device, or another location device) and a barometric pressure device (e.g., for capturing a user device barometric pressure reading). The user device(s) 125 may be configured to provide user device data to the altitude server 105, as described herein.

The weather station(s) 130 may include one or more capable of receiving, generating, storing, processing, and/or providing information associated with determining an altitude of a small cell, as described elsewhere herein. For example, the weather station(s) 130 may include a server device or a group of server devices. In some implementations, the weather station(s) 130 may be associated with a reference structure that serves as a point of reference for the small cell 110 and/or the user device(s) 125. For example, the reference structure may include a building, a landmark, an object, and/or the like. The weather station(s) 130 may include a location device (e.g., a GPS device, or another location device), a barometric pressure device (e.g., for capturing a weather station barometric pressure reading), and/or other weather measurement equipment (for capturing other weather measurements). The user device(s) 125 may be configured to provide weather station data to the altitude server 105, as described herein.

The external server 135 may include one or more devices capable of receiving, generating, storing, processing, providing, and/or routing information associated with determining an altitude of a small cell, as described elsewhere herein. The external server 135 may include a communication device and/or a computing device. For example, the external server 135 may include a server, such as an application server, a client server, a web server, a database server, a host server, a proxy server, a virtual server (e.g., executing on computing hardware), or a server in a cloud computing system. In some implementations, the external server 135 may include computing hardware used in a cloud computing environment. In some implementations, the external server 135 may be a spectrum access system server and/or a location server (e.g., that is associated with an emergency services provider).

The network 210 may include one or more wired and/or wireless networks. For example, the network 210 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 210 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Figure 3:
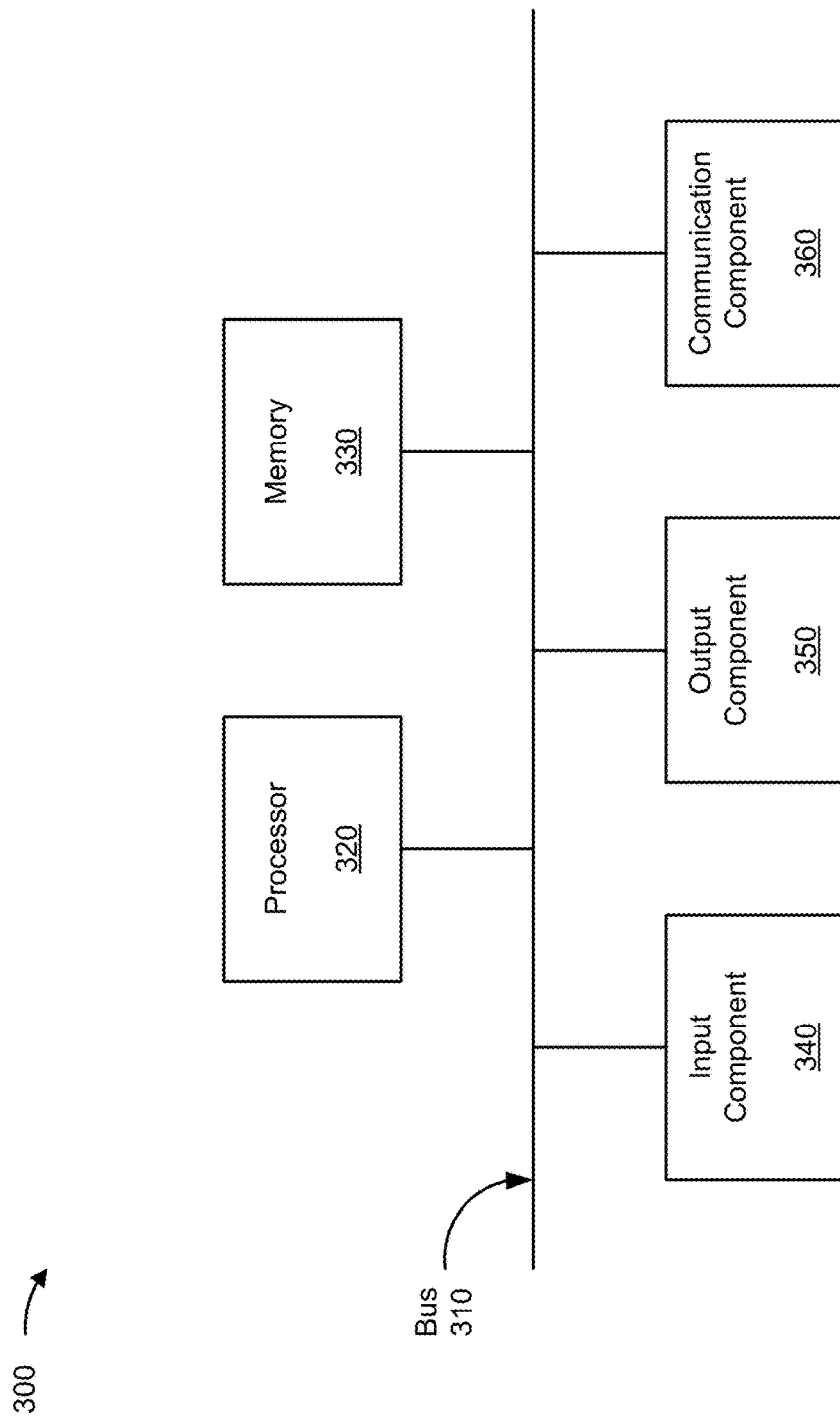
FIG. 3 is a diagram of example components of a device associated with determining an altitude of a small cell.

FIG. 3 is a diagram of example components of a device 300 associated with determining an altitude of a small cell. The device 300 may correspond to the altitude server 105, the small cell 110, the small cell element management server 115, the network storage device 120, the one or more user devices 125, the one or more weather stations 130, and/or the external server 135. In some implementations, the altitude server 105, the small cell 110, the small cell element management server 115, the network storage device 120, the one or more user devices 125, the one or more weather stations 130, and/or the external server 135 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
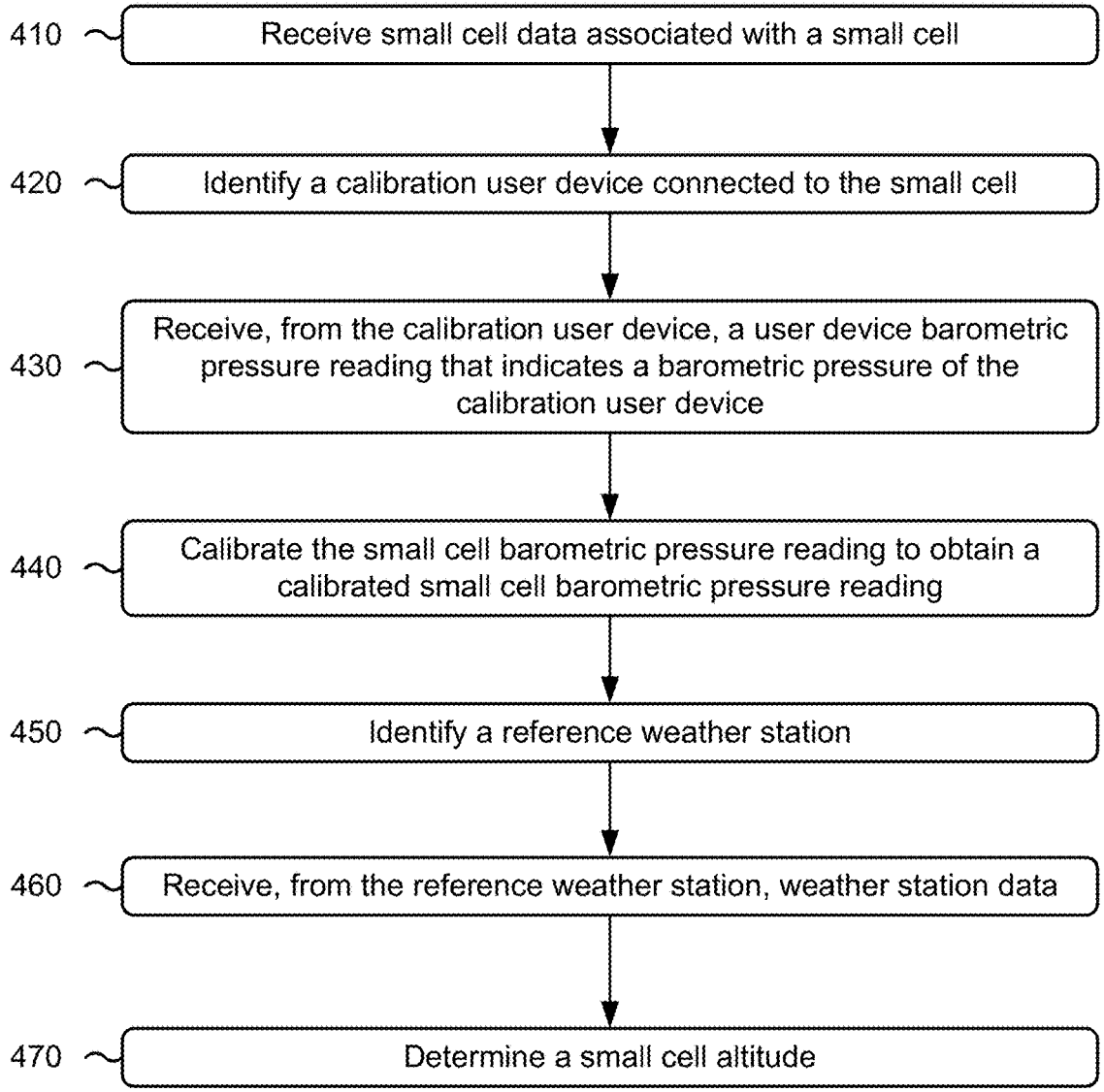
FIG. 4 is a flowchart of an example process associated with determining an altitude of a small cell.

FIG. 4 is a flowchart of an example process 400 associated with determining an altitude of a small cell. In some implementations, one or more process blocks of FIG. 4 may be performed by a device (e.g., the altitude server 105). In some implementations, one or more process blocks of FIG. 4 may be performed by another device or a group of devices separate from or including the device, such as a small cell (e.g., the small cell 110), an small cell element management server (e.g., the small cell element management server 115), a network storage device (e.g., the network storage device 120), a user device (e.g., the user device 125), a weather station (e.g., the weather station 130), and/or an external server (e.g., the external server 135). Additionally, or alternatively, one or more process blocks of FIG. 4 may be performed by one or more components of device 300, such as processor 320, memory 330, input component 340, output component 350, and/or communication component 360.

As shown in FIG. 4, process 400 may include receiving small cell data associated with a small cell (block 410). For example, the device may receive small cell data associated with a small cell, as described above. In some implementations, the small cell data includes small cell location data, which indicates a physical location of the small cell, and a small cell barometric pressure reading that indicates a barometric pressure of the small cell at the physical location. In some implementations, the small cell location data includes a longitude component and a latitude component.

As further shown in FIG. 4, process 400 may include identifying a calibration user device connected to the small cell (block 420). For example, the device may identify a calibration user device connected to the small cell, as described above. In some implementations, identifying the calibration user device comprises identifying a plurality of user devices connected to the small cell, receiving, from the plurality of user devices, small cell power measurements corresponding to the plurality of user devices, wherein a small cell power measurement, of the small cell power measurements, indicates a power level of a signal received from the small cell by a corresponding one of the plurality of user devices, identifying a user device, of the plurality of user devices, that is associated with a highest small cell power measurement of the small cell power measurements, and identifying the user device as the calibration user device.

As further shown in FIG. 4, process 400 may include receiving, from the calibration user device, a user device barometric pressure reading that indicates a barometric pressure of the calibration user device (block 430). For example, the device may receive, from the calibration user device, a user device barometric pressure reading that indicates a barometric pressure of the calibration user device, as described above. In some implementations, receiving the small cell data comprises receiving the small cell data from a small cell element management server, wherein the small cell element management server receives the small cell data from the small cell.

As further shown in FIG. 4, process 400 may include calibrating the small cell barometric pressure reading to obtain a calibrated small cell barometric pressure reading (block 440). For example, the device may calibrate, based on the user device barometric pressure reading, the small cell barometric pressure reading to obtain a calibrated small cell barometric pressure reading, as described above.

As further shown in FIG. 4, process 400 may include identifying a reference weather station (block 450). For example, the device may identify a reference weather station, as described above. In some implementations, identifying the reference weather station comprises identifying a plurality of weather stations within a distance threshold of the small cell, receiving, from the plurality of weather stations, weather station location data corresponding to the plurality of weather stations, wherein the weather station location data associated with a particular weather station indicates a latitude component of the particular weather station and a longitude component of the particular weather station, and identifying, based on the weather station location data, a weather station, of the plurality of weather stations, that is closest to the small cell, and identifying the weather station as the reference weather station.

As further shown in FIG. 4, process 400 may include receiving, from the reference weather station, weather station data (block 460). For example, the device may receive, from the reference weather station, weather station data, as described above. In some implementations, the weather station data includes a weather station barometric pressure reading that indicates a barometric pressure of the reference weather station, and a weather station altitude that indicates an altitude of the reference weather station.

As further shown in FIG. 4, process 400 may include determining a small cell altitude (block 470). For example, the device may determine a small cell altitude based on the calibrated small cell barometric pressure reading and the weather station data, as described above.

In some implementations, process 400 includes transmitting, to a small cell element management server, small cell altitude data corresponding to the small cell altitude, and wherein transmitting the small cell altitude data permits the small cell element management server to store the small cell altitude data in a storage device in association with the small cell data.

In some implementations, process 400 includes repeating the method after a time threshold has passed.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device having one or more processors, small cell data associated with a small cell,
      wherein the small cell data includes small cell location data, which indicates a physical location of the small cell, and a small cell barometric pressure reading that indicates a barometric pressure of the small cell at the physical location, and
      wherein the small cell location data includes a longitude component and a latitude component;
   identifying, by the device, a user device connected to the small cell to act as a calibration user device;
   receiving, by the device and from the calibration user device, a user device barometric pressure reading that indicates a barometric pressure of the calibration user device;
   calibrating, by the device and based on the calibration user device barometric pressure reading, the small cell barometric pressure reading to obtain a calibrated small cell barometric pressure reading;
   determining, by the device, a small cell altitude based on the calibrated small cell barometric pressure reading; and
   modifying, by a server associated with the small cell, a spectrum allocation for the small cell based on the small cell altitude.

2. The method of claim 1, wherein identifying the user device connected to the small cell to act as the calibration user device comprises:
  identifying a plurality of user devices connected to the small cell;
  receiving, from the plurality of user devices, small cell power measurements corresponding to the plurality of user devices,
    wherein a small cell power measurement, of the small cell power measurements, indicates a power level of a signal received from the small cell by a corresponding one of the plurality of user devices;
  identifying a user device, of the plurality of user devices, that is associated with a highest small cell power measurement of the small cell power measurements; and
  identifying the user device as the calibration user device.

3. The method of claim 1, wherein receiving the small cell data comprises:
  receiving the small cell data from a small cell element management server,
    wherein the small cell element management server receives the small cell data from the small cell.

4. The method of claim 1, further comprising:
  transmitting, to a small cell element management server, small cell altitude data corresponding to the small cell altitude; and
    wherein transmitting the small cell altitude data permits the small cell element management server to store the small cell altitude data in a storage device in association with the small cell data.

5. The method of claim 1, further comprising:
  identifying a reference weather station; and
  receiving, by the device and from the reference weather station, weather station data,
    wherein the weather station data includes a weather station barometric pressure reading that indicates a barometric pressure of the reference weather station, and a weather station altitude that indicates an altitude of the reference weather station, and
    wherein the device determines the small cell altitude based on the calibrated small cell barometric pressure reading and the weather station data.

6. The method of claim 5, wherein identifying the reference weather station comprises:
  identifying a plurality of weather stations within a distance threshold of the small cell;
  receiving, from the plurality of weather stations, weather station location data corresponding to the plurality of weather stations,
    wherein the weather station location data associated with a particular weather station indicates a latitude component of the particular weather station and a longitude component of the particular weather station;
  identifying, based on the weather station location data, a weather station, of the plurality of weather stations, that is closest to the small cell; and
  identifying the weather station as the reference weather station.

7. A device, comprising:
  one or more processors configured to:
    receive small cell data that includes a small cell barometric pressure reading that indicates a barometric pressure of a small cell;
    identify a device to act as a calibration device via which the small cell barometric pressure reading is to be calibrated;
    receive, from the calibration device, a calibration device barometric pressure reading that indicates a barometric pressure of the calibration device;
    calibrate, based on the calibration device barometric pressure reading, the small cell barometric pressure reading to obtain a calibrated small cell barometric pressure reading;
    receive, from a reference weather station, weather station data,
      wherein the weather station data includes a weather station barometric pressure reading that indicates a barometric pressure of the reference weather station, and a weather station altitude that indicates an altitude of the reference weather station;
    determine a small cell altitude based on at least one of the calibrated small cell barometric pressure or the weather station data;
    transmit, to a server associated with the small cell, small cell altitude data corresponding to the small cell altitude; and
    cause the server to modify a spectrum allocation for the small cell based on the small cell altitude data.

8. The device of claim 7, wherein the calibration device is a user device connected to the small cell, and
  wherein the one or more processors are further configured to:
    identify, based on one or more factors, the user device from one or more user devices connected to the small cell.

9. The device of claim 8, wherein a factor, of the one or more factors, is a small cell power measurement that indicates a power level of a signal received from the small cell by the user device,
  wherein the user device has a highest small cell power measurement from the small cell of the one or more user devices.

10. The device of claim 8, wherein a factor, of the one or more factors, is a distance of the user device to the small cell,
  wherein the user device is physically closest to the small cell of the one or more user devices.

11. The device of claim 7, wherein the reference weather station is a weather station, of one or more weather stations, that is closest to the small cell of the one or more weather stations.

12. The device of claim 7, wherein the one or more processors are further configured to:
  transmit, to a small cell element management server, the small cell altitude data,
    wherein transmitting the small cell altitude data permits the spectrum allocation for the small cell to be modified.

13. The device of claim 7, wherein the small cell data includes small cell location data that indicates a physical location of the small cell,
  wherein the small cell location data includes a longitude component associated with the physical location, and a latitude component associated with the physical location, and
  wherein the one or more processors are further configured to:
    identify the reference weather station from a plurality of weather stations, wherein the reference weather station is closest, of the plurality of weather stations, to the physical location.

14. A non-transitory computer-readable medium storing a set of instructions, the set of instructions comprising:
one or more instructions that, when executed by one or more processors of a device, cause the device to:
receive, from a small cell, small cell data including small cell location data and a small cell barometric pressure reading that indicates a barometric pressure of the small cell,
wherein the small cell location data includes a longitude component and a latitude component;
transmit the small cell data to an altitude server;
receive, from the altitude server, small cell altitude data that indicates a small cell altitude,
wherein the small cell altitude is based on at least one of a calibrated small cell barometric pressure reading or weather station data associated with a reference weather station,
wherein the calibrated small cell barometric pressure reading is based on the small cell barometric pressure reading and a calibration device barometric pressure reading that indicates a barometric pressure of a calibration device, and
wherein the weather station data includes a weather station barometric pressure reading that indicates a barometric pressure of the reference weather station, and a weather station altitude that indicates an altitude of the reference weather station;
store the small cell location data and the small cell altitude data;
transmit, to an external server, the small cell altitude data; and
cause the external server to modify a spectrum allocation for the small cell based on the small cell altitude data.

15. The non-transitory computer-readable medium of claim 14, wherein the calibration device is a user device connected to the small cell.

16. The non-transitory computer-readable medium of claim 14, wherein the calibration device is the reference weather station.

17. The non-transitory computer-readable medium of claim 14, wherein the reference weather station is closest, of a plurality of weather stations, to the small cell.

18. The non-transitory computer-readable medium of claim 14, wherein the one or more instructions further cause the device to:
transmit, to the external server, the small cell altitude data and the small cell location data on a scheduled basis.

19. The non-transitory computer-readable medium of claim 18, wherein the external server includes a spectrum access system server.

20. The non-transitory computer-readable medium of claim 18, wherein the external server includes a location server.

* * * * *